US012277688B2

United States Patent
Gopalkrishna et al.

(10) Patent No.: US 12,277,688 B2
(45) Date of Patent: Apr. 15, 2025

(54) MULTI-TASK TEXT INPAINTING OF DIGITAL IMAGES

(71) Applicant: CareAR Holdings LLC, Norwalk, CT (US)

(72) Inventors: Vijay Kumar Baikampady Gopalkrishna, Santa Clara, CA (US); Raja Bala, Pittsford, NY (US)

(73) Assignee: CAREAR HOLDINGS LLC, Norwalk, CT (US)

( * ) Notice: Subject to any disclaimer, the term of this patent is extended or adjusted under 35 U.S.C. 154(b) by 719 days.

(21) Appl. No.: 17/363,253

(22) Filed: Jun. 30, 2021

(65) Prior Publication Data

US 2023/0005107 A1 Jan. 5, 2023

(51) Int. Cl.
| | |
|---|---|
| *G06K 9/00* | (2022.01) |
| *G06T 5/77* | (2024.01) |
| *G06T 7/11* | (2017.01) |
| *G06T 7/194* | (2017.01) |
| *G06T 11/60* | (2006.01) |

(52) U.S. Cl.
CPC ............ *G06T 5/77* (2024.01); *G06T 7/11* (2017.01); *G06T 7/194* (2017.01); *G06T 11/60* (2013.01); *G06T 2207/20081* (2013.01); *G06T 2207/20084* (2013.01)

(58) Field of Classification Search
CPC ............ G06T 7/194; G06T 11/60; G06T 2207/20081; G06T 2207/20084; G06T 7/11; G06N 3/0455; G06N 3/045
See application file for complete search history.

(56) References Cited

U.S. PATENT DOCUMENTS

| | | | |
|---|---|---|---|
| 9,014,255 B2 | 4/2015 | Schweid et al. | |
| 9,042,649 B2 * | 5/2015 | Tian | G06T 7/11 |
| | | | 382/173 |
| 9,300,840 B2 * | 3/2016 | Hasegawa | H04N 1/407 |
| 10,896,493 B2 | 1/2021 | Safdarnejad et al. | |
| 2014/0185104 A1 | 7/2014 | Hasegawa | |
| 2016/0004921 A1 | 1/2016 | McCarthy | |

(Continued)

FOREIGN PATENT DOCUMENTS

| | | | |
|---|---|---|---|
| DE | 102018128531 A1 * | 5/2020 | |
| WO | WO-2020038207 A1 * | 2/2020 | ............. G06T 5/005 |

OTHER PUBLICATIONS

Wu, L. et al., "Editing Text in the Wild", ACM Int. Conf. Multimedia, 2019. (Year: 2019).*

(Continued)

*Primary Examiner* — Molly Wilburn
*Assistant Examiner* — Aidan Keup
(74) *Attorney, Agent, or Firm* — Fox Rothschild LLP

(57) ABSTRACT

A multi-task text infilling system receives a digital image and identifies a region of interest of the image that contains original text. The system uses a machine learning model to determine, in parallel: a foreground image that includes the original text; a background image that omits the original text; and a binary mask that distinguishes foreground pixels from background pixels, The system receives a target mask that contains replacement text. The system then applies the target mask to blend the background image with the foreground layer image and yield a modified digital image that includes the replacement text and omits the original text.

36 Claims, 5 Drawing Sheets

(56) References Cited

U.S. PATENT DOCUMENTS

| | | | |
|---|---|---|---|
| 2016/0140701 A1 | 5/2016 | Angara et al. | |
| 2020/0074709 A1 | 3/2020 | Bhat et al. | |
| 2020/0320324 A1 | 10/2020 | Goncalves et al. | |
| 2021/0357512 A1 | 11/2021 | Busila et al. | |
| 2022/0292649 A1 | 9/2022 | Wang et al. | |
| 2022/0301118 A1* | 9/2022 | Frey | G06T 11/60 |

OTHER PUBLICATIONS

Azadi, S. et al., "Multi-content gan for few-shot font style transfer", IEEE Conf. Comput. Vis. Pattern Recog., 2018.

Chen, J. et al., "Bilateral Guided Upsampling", ACM Trans. Graph., 35(6), 2016.

Gharbi, M. et al., Deep bilateral learning for real-time image enhancement, ACM Trans. Graph., 36(4), 2017.

Gharbi, M. et al., "Transform Recipes for Efficient Cloud Photo Enhancement", ACM Trans. Graph., 34(6), 2015.

He, K. et al., "Mask R-CNN," Computer Vision Foundation, pp. 2961-2969.

Hu, J. et al., "Image-to-Image Translation with Conditional-GAN," CS230: Deep Learning, Spring 2018, Stanford University, CA.

Kim, D. et al., "Deep Blind Video Decaptioning by Temporal Aggregation and Recurrence," Computer Vision Foundation, pp. 4263-4272.

Liu, G. et al., "Image Inpainting for Irregular Holes Using Partial Convolutions", ECCV 2018.

Nakamura, T., et al., "Scene Text Eraser," arXiv:1705.02772v1 [cs:CV] May 8, 2017.

Roy, P. et al., "STEFANN: Scene Text Editor Using Font Adaptive Neural Network", IEEE Conf. Comput. Vis. Pattern Recog., 2020.

Tursun, O. et al., "MTRNet: A Generic Scene Text Eraser," arXiv:1903.04092v3 [cs.CV] Oct. 22, 2019.

Ulyanov, D., et al., "Deep Image Prior," Computer Vision Foundation, pp. 9446-9454.

Wang, T.C. et al., "High-Resolution Image Synthesis and Semantic Manipulation with Conditional GA Ns," arXiv:1711.11585v2 [cs.CV] Aug. 20, 2018.

Wang, T.C. et al., "Video-to-Video Synthesis," arXiv:1808.06601v2 [cs:CV] Dec. 3, 2018.

Wexler, Y. et al., "Space-Time Video Completion," Dept. of Computer Science and Applied Math, The Weizmann Institute of Science, Rehovot, 76100 Israel.

Wu, L. et al., "Editing Text in the Wild", ACM Int. Conf. Multimedia, 2019.

Xu, R. et al., "Deep Flow-Guided Video Inpainting," Computer Vision Foundation, pp. 3723-3732.

Yang, Q. et al., "Swaptext: Image based texts transfer in scenes", IEEE Conf. Comput. Vis. Pattern Recog., 2020.

Yang, S. et al. "Controllable Artistic Text Style Transfer via Shape-Matching GAN", Int. Conf. Comput. Vis., 2019.

Yang, S. et al., "Awesome typography: Statistics-based text effects transfer" IEEE Conf. Comput. Vis. Pattern Recog., 2017.

Yang, S. et al., "TET-GAN: Text Effects Transfer via Stylization and Destylization", AAAI 2019.

Yu, J. et al., "Free-Form Image Inpainting with Gated Convolution", ICCV, arXiv:1806.03589 [cs.CV], 2018.

Yu, J. et al., "Generative Image Inpainting with Contextual Attention," Computer Vision Foundation, pp. 5505-5514.

Zhang, L. et al., "Deep Image Blending", WAVC 2020 paper, IEEE Xplore.

Zhang, S. et al., "EnsNet: Ensconce Text in the Wild," arXiv:1812.00723v1 [cs.CV] Dec. 3, 2018.

Information about Related Patents and Patent Applications, see section 4 of the accompanying Information Disclosure Statement Letter, which concerns Related Patents and Patent Applications.

* cited by examiner

MULTI-TASK TEXT INPAINTING OF DIGITAL IMAGES

BACKGROUND

There are many situations in which the removal of scene text from an image or sequence of video image frames is desirable. For example, video sequences may contain images of storefronts with names, street signs, license plates, and other scenes that contain text. In some situations, it is desirable to remove the scene text from the images to prevent disclosure of personally identifiable information, such as street names or vehicle plate numbers, to others who view the images. In other situations, it is desirable to remove scene text to avoid creating images that contain a logo or product name that conflicts with obligations to advertisers or sponsors of the image or video sequence. In other situations, it us desirable to remove scene text and replace it with personalized messages or messages that suit the storyline that the images are presenting. Other applications, such as translation of scene text, can also benefit from text removal and replacement processes.

The removal of scene text from digital images is sometimes referred to as "text infilling" or "text inpainting." Manual text infilling is very time consuming, and it can be imprecise. Therefore, several automated text infilling methods are known. However, the existing methods often yield results in which the tone or texture of the infilled text is still distinguishable from the original background, and/or results in which the background tone or texture has been altered to match the infilled area. This is an especially challenging problem when an image's background exhibits texture or some other form of varying intensity and/or color. In other situations, the background immediately adjacent to the text may be changed to white or some other color or texture that does is not consistent with that of the rest of the background. This results in images which do not appear natural, and it is not acceptable in applications such as video personalization that require higher fidelity results.

This document describes methods and systems that are directed to addressing the issues listed above.

SUMMARY

Methods and systems for editing digital image frames are described in this document. The system will include a processor and programming instructions that, when executed, will cause the processor to receive a digital image frame, process the digital image frame to define a region of interest (ROI) that contains original text, and process the ROI through a multi-task machine learning model such as a deep neural network. Processing the ROI through the model will determine, in parallel processes: (i) a foreground image of the ROI, wherein the foreground image comprises the original text; (ii) a background image of the ROI, wherein the background image omits the original text; and (iii) a binary mask that distinguishes foreground image pixels from background image pixels in the ROI. Then, when the system receives a target mask that contains replacement text, the system will apply the target mask to blend the background image with the foreground image and yield a modified digital image that includes the replacement text and omits the original text.

In some embodiments, the multi-task machine learning model may include a single deep neural encoder for receiving the ROI, along with separate deep neural decoders for predicting each of the foreground image, the background image and the binary mask.

Optionally, the system also may include a dataset of ground truth foreground images, ground truth background images and ground truth mask images. The system may use the dataset to train the machine learning model by allowing the dataset to process the images of the dataset with one or more of the following losses: background reconstruction loss; background adversarial loss; foreground reconstruction loss; mask reconstruction loss; end to end reconstruction loss; and/or end to end adversarial loss.

In some embodiments, before applying the target mask, the system may generate a residual correction signal, and it may apply the residual correction signal to the background image. For example, the system may: (a) use the binary mask to extract an average background signal from the ROI of the digital image frame; (b) identify an average background signal of the background image; (c) generate a residual signal as a difference between the average background signal extracted by the binary mask for the ROI of the digital image frame and the average background signal of the background image; and (d) modify the background image by adding the residual signal to substantially every pixel in the background image.

In some embodiments, the system may use the binary mask to extract an average foreground signal from the foreground image. The system may then modify the foreground image by adding the extracted average foreground signal to the foreground image.

In some embodiments, when applying the target mask to blend the background image with the foreground image and yield the modified digital image, the system may generate a modified ROI by applying the target mask to blend the background image with the foreground image, and it may replace the ROI of the received digital image frame with the modified ROI. Optionally, the blending action may include assigning a color value of the foreground image to foreground pixels of the target mask, and assigning a color value of the background image to background pixels of the target mask. Optionally, the blending action also may include using a generative neural network to blend the foreground image with the background image through the target mask.

In some embodiments, to process the digital image frame to define the ROI the system may apply a text detector to the digital image frame to return bounding box coordinates, and the system may then define the ROI according to the bounding box coordinates.

DETAILED DESCRIPTION

Figure 1:
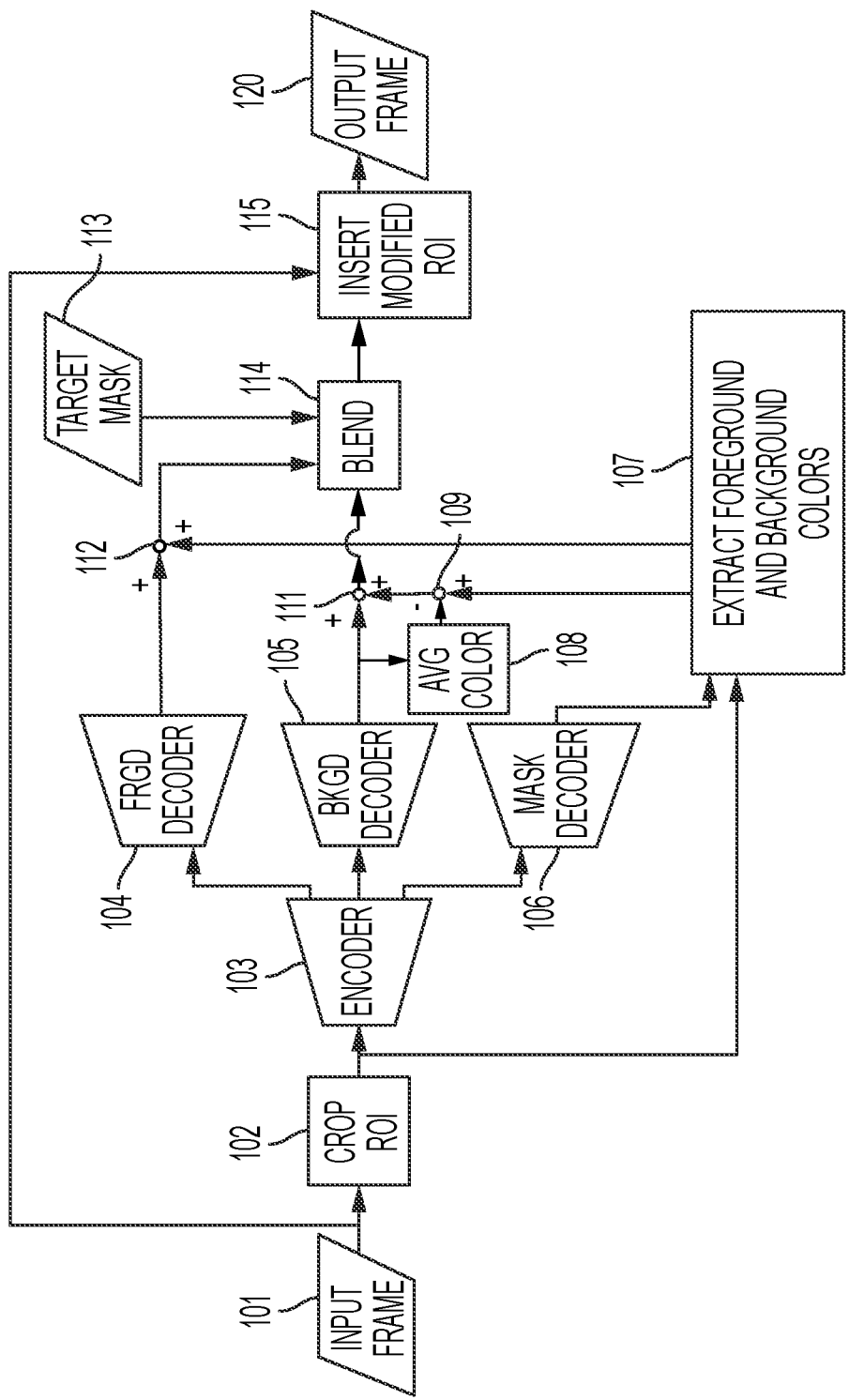
FIG. 1 illustrates an example text infilling process for an image or video sequence.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and it is not intended to require a sequential order unless specifically stated.

The term "approximately," when used in connection with a numeric value, is intended to include values that are close to, but not exactly, the number. For example, in some embodiments, the term "approximately" may include values that are within +/−10 percent of the value.

In this document, the term "average" or "averaging" refers to the calculation of a mean value of a group of values. In addition, unless specifically stated otherwise, the terms can also apply to the calculation of some similar middle value of a set such as a median, or the result of a process that first eliminates high and/or low outliers before calculating a middle value.

In this document, the term "substantially every", when referring to a particular parameter, means that a great majority of such parameters satisfies a condition. In various embodiments, the majority may be at least 80%, at least 85%, at least 90%, or at least 95% of the parameters.

In this document, the term "text" will be used to refer to a sequence of one or more characters, and it may include alphanumeric characters such as letters and numbers, characters that represent words or portions of words in various languages such as kanji and hanzi, as well as punctuation marks, mathematical symbols, emojis, and other symbols.

Additional terms that are relevant to this disclosure will be defined at the end of this Detailed Description section.

As noted in the Background section above, the removal of scene text from digital images is sometimes referred to as "text infilling" or "text inpainting". There are several known methods of text infilling, including methods that use deep neural networks. One known method uses methods known as "pix2pix", in which conditional generative adversarial network (GAN) transforms a first image to a second image. The pix2pix method is described in numerous publications, including Wang et al., "High Resolution Image Synthesis and Semantic Manipulation with Conditional GANs" (arxiv: 1711.11585 [cs.CV], 2018). The conditional GAN of pix2pix is trained on a dataset of image pairs [s, x] in which each s is a semantic label map (i.e., images in which labels have been assigned to text) and each x is a corresponding natural photo. The pix2pix method uses a generator G and a discriminator D. The role of the generator is to translate semantic label maps into realistic-looking images. The role of the discriminator is to take the output of the generator and try to distinguish real images from translated ones. Training enables the conditional GAN to map images that contain text to inpainted versions of those images, from which the text has been removed. In the pix2pix method, a generator such as the U-Net encoder-decoder network may be used, and a discriminator such as a patch-based fully convolutional network may be used. This is known and has been described in more detail in, for example, Hu et al., "Image-to-Image Translation with Conditional-GAN" (Stanford University 2018). The pix-to-pix method uses a single encoder and decoder in its generator network.

The pix2pix method can be used for text infilling of individual images, but it may be time-consuming and inefficient to apply to a sequence of video images. In addition, even if used, in current applications it can result in image frames that have the issues described in the Background section above.

To address this, this document describes a novel method of applying text infilling to a digital image or a video sequence of digital image frames. A text region of interest (ROI) is represented in terms of three elements: a foreground (text) image, a background image, and a mask that specifies the foreground vs. background pixels. The system uses a multi-task network architecture that may simultaneously predict these three images. This enables the inpainting network to determine the location of the text and extract precise color and texture for the foreground and background, and thus improve the quality of the text inpainting process. In addition, segregating the input image into background, foreground and mask images can help the system define specific loss functions for the individual components, as well as on the new image that the system creates by combining these components.

Figure 2:
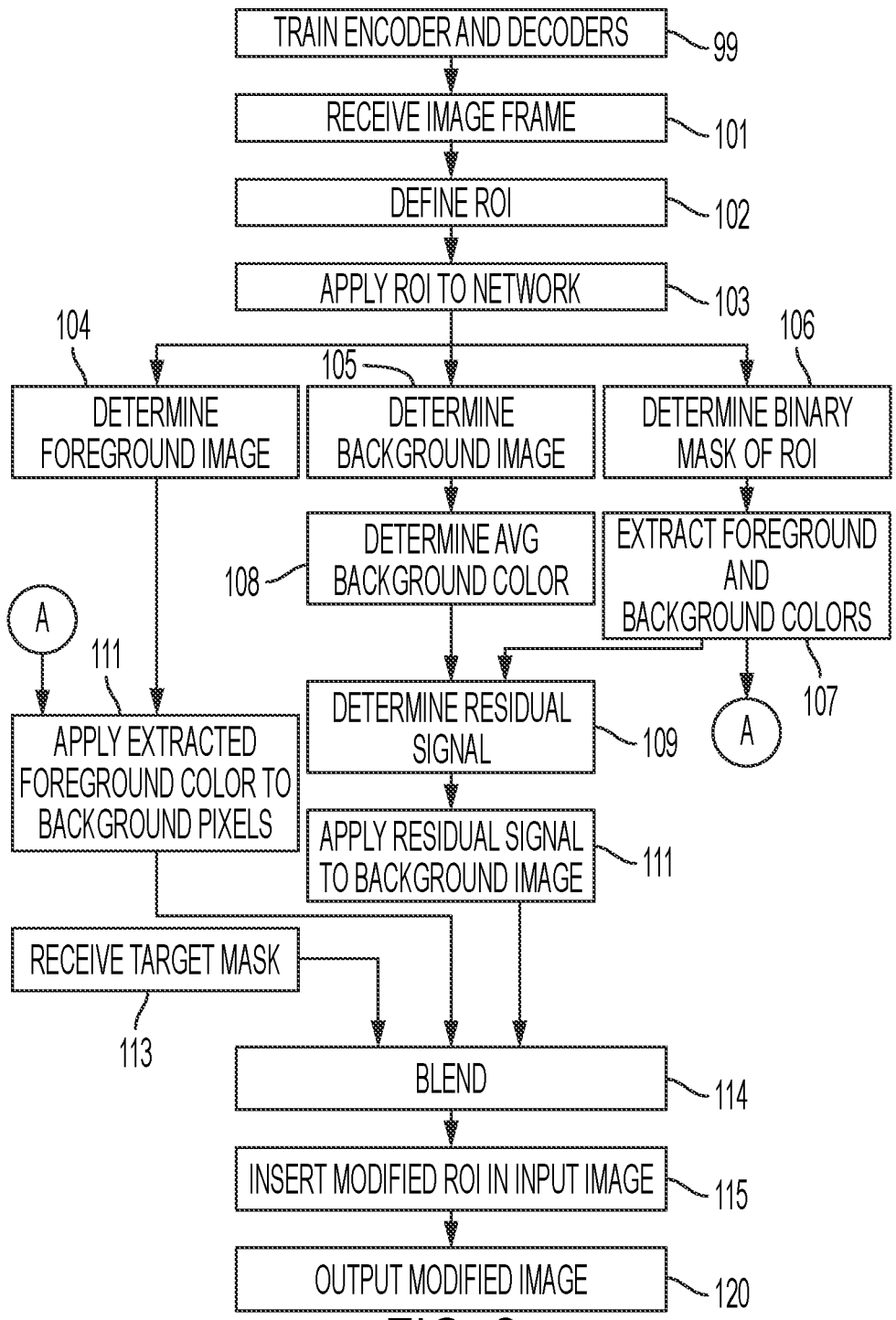
FIG. 2 illustrates the steps of FIG. 1 in flowchart format.

An example workflow is shown in FIG. 1. FIG. 2 illustrates the steps of FIG. 1 in flowchart format. At 101 an image processing system will receive a digital image frame. (The process described in this document may be repeated and performed on multiple image frames of a video sequence, but to simplify the description we will explain the process as applied to one of the frames.) The system may do this by receiving the image from a remote computing device via a communication link, by retrieving it from a local or cloud-based memory device, or in real-time as a camera of the system captures digital image frames as a video.

Figure 3:
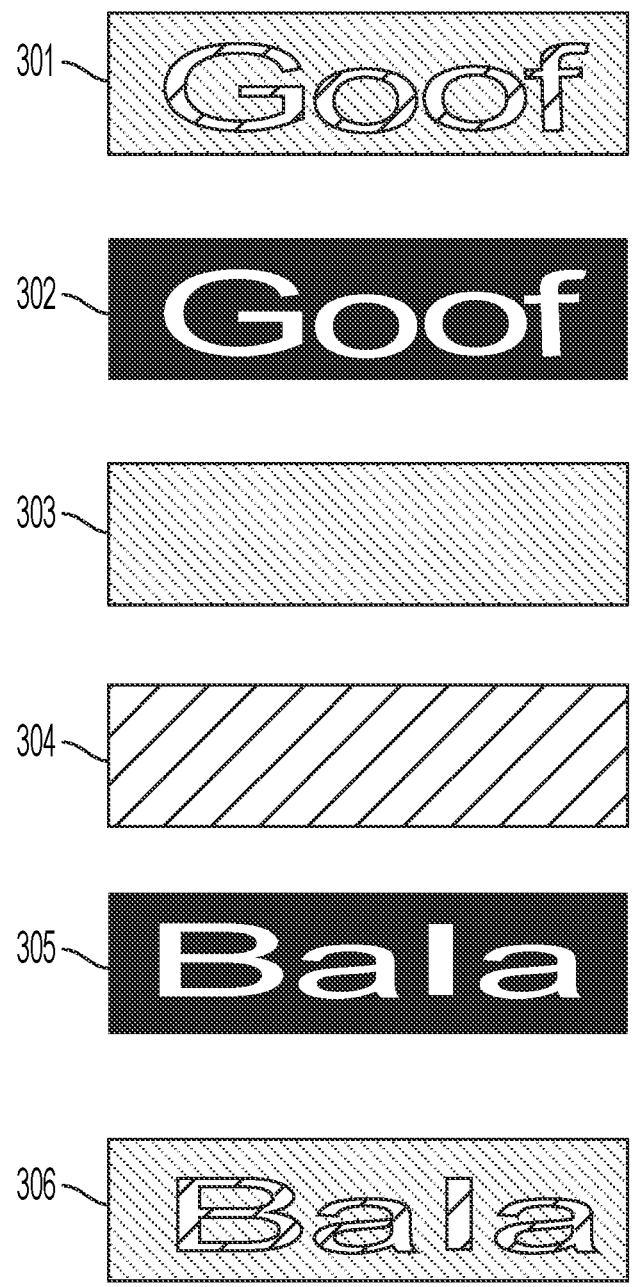
FIG. 3 illustrates various layers and masks that may generated by various tasks of the text infilling processes of this document.

The image frames received at step 101 may be pre-processed, in that they have been cropped to identify a defined region ROI that contains text. If not, then at 102 the system may process the image frames with a text detector that returns bounding box coordinates for cropping the text ROI in each frame. A text detector is a set of programming instructions that a computing device uses to process an image with a feature detector such as the tesseract algorithm, a maximally stable extremal regions (MSER) algorithm detector, a convolutional neural network (CNN) or any now or hereafter known optical character recognition (OCR) process. FIG. 3 illustrates an example ROI 301 that contains a foreground region that exhibits a first color and/or texture, along with a background region that exhibits of a second color and/or texture. The foreground region includes the pixels that include text, while the background region includes the pixels that do not contain text.

Returning to FIGS. 1 and 2, at 103 the system then applies the ROI to an encoder of a neural network or other machine learning model which converts the ROI image into a format that the network may then process, such as a multidimensional tensor. The encoder used at 103 may be (as shown in FIG. 1) a single, deep neural encoder that is shared by multiple decoders. The output of the encoder is then simultaneously passed to three decoders: a foreground image decoder, a background image decoder, and a binary image decoder, which perform a parallel process to simultaneously predict the three constituent image that make up the single ROI input. Optionally, some or all of the decoders may be deep neural network decoders. At 104 the foreground image decoder of the neural network will predict a foreground image of the ROI, in which the foreground image includes color values for the text of the ROI. At 105 the background image decoder of the network will determine a background image of the ROI, in which the background image includes color values for areas of the ROI that do not contain the text of the ROI. This process, also referred to as text inpainting, will be described in more detail below.

At 106 the binary mask decoder of the network will predict a binary mask that distinguishes the foreground pixels from the background pixels by assigning each pixel a value of either 0 or 1, as shown by way of example in mask 302 of FIG. 3. In reality, the neural decoder predicts the probability of each pixel being a foreground color, taking on values between 0 and 1. This probability map is then converted to a binary mask with a suitable thresholding operator. In mask 302, foreground pixels have a value of 1 while background pixels have a value of 0, but in practice this assignment could also be reversed such that foreground pixels have a value of 0 while background pixels have a value of 1. Boundary pixels may be assigned strictly 1 or 0, or they may be assigned intermediate values in order to ensure smooth transitions from foreground to background. The encoder may be trained jointly with the three decoders (foreground, background, mask) as is described later in this document.

Returning again to FIGS. 1 and 2, ideally the predicted background and foreground images produced by the decoders should exactly match the input ROI in the background and foreground regions respectively. However the decoders are likely to introduce errors. To reduce the magnitude of these errors, a residual post-correction step is introduced. First the system applies the binary mask to the input ROI to extract the average color of the input foreground pixels and the average color of the input background pixels, respectively, at 107. The system may use the binary mask to extract a foreground average color by averaging the color values of pixels of the input image that correspond to foreground pixels in the mask. Similarly, the system may use the binary mask to extract a background average color by averaging the color values of input image pixels that correspond to background pixels in the mask. Optionally, the average value may be a weighted average. If the mask is a continuous-valued map indicating probability of foreground, then these probabilities are treated as foreground weights. A weighted foreground average may be computed by performing pixel-wise multiplication of foreground weights and foreground colors, summing the products, and dividing by the sum of foreground weights. The process is repeated to compute a weighted background average, except that background weight is computed as 1-{foreground weight}.

Next the system uses the binary mask to determine an average background color signal (step 108) from the output image predicted by the background decoder using the same set of steps described above. This average predicted background color signal is subtracted channelwise for each of R, G, B from the average input background color signal from 107, and the difference will form a residual correction signal [$\Delta R$, $\Delta G$, $\Delta B$] at 109. At 111 the system will then add the residual signal to substantially every pixel of the predicted background image. This will result in a predicted background image as shown by area 303 of FIG. 3, in which pixels of the ROI that contain text have been infilled with the predicted background color. At 112 the system will add the average input foreground color computed from the input ROI to substantially every pixel in the predicted foreground image. This will result in a corrected foreground image as shown by area 304 of FIG. 3, in which pixels of the ROI that do not contain text have been infilled with the predicted foreground color.

At 113 the system will receive a target mask, which is a binary mask that contains a new replacement text string. FIG. 3 illustrates an example target mask 305, in which, as with the binary mask 302 for the input image, foreground pixels continue to have a value of 1 while background pixels have a value of 0.

At 114 the system will then use the target mask to blend the predicted background image and the predicted foreground image to yield a modified ROI. The blending process may be performed by simple binary switching, in which background pixels of the target mask are assigned color values of the predicted background image while foreground pixels of the target mask are assigned color values of the predicted foreground image. Alternatively, the blending may be performed using any now or hereafter known blending process such as those that use a generative adversarial network. (See, for example, Zhang et. Al., "Deep Image Blending", arXiv: 1910.11495 [cs.cv] 2020.)

At 115 the system will the replace the ROI of the input image with the modified ROI to yield a modified image. The modified image is then output at 120.

In the process described above, "color" has been described as a single value for the purpose of describing the process. However, in practice, each pixel of the ROI will have a color value in an RGB color model, which means that the color value will include three channels (one for a red component R, one for a blue component G, and one for a blue component B). Pixels may include additional channels for additional characteristics, such as luminance or chrominance. Thus, the process described above may be performed for each available channel. In such situations, the average foreground color, average background color, and residual signal will be C-dimensional vectors, in which C represents the number of available channels of the network. When determining averages, or when adding or blending, some channels may be given different weights than others. For example, the system may assign equal weights to RGB channels, but other channels such as those for characteristics such as luminance and chrominance may have unequal weights in various processes.

As noted in FIG. 1, before the image process begins the single encoder and separate decoders may be jointly trained at 99. Therefore, in various embodiments, the neural networks used for the encoding and decoding may be trained to minimize one or more of the following loss terms:

For the Background Image:

Reconstruction loss: This is the error between a predicted background image (i.e. inpainted ROI) and ground truth. This prediction includes the residual correction that would be performed at step 108. This loss may be defined in a pixel space (i.e., L1 norm, which is the sum of absolute pixel values, or L2 norm, which is the square root of the sum of squared pixel values), spatially filtered pixel values, or feature space (such as perceptual loss in a VGG convolutional neural network architecture).

Spatial adversarial loss: The decoder must be trained on a dataset that includes ground truth foreground, background and mask images with one or more of the following losses to produce realistic inpainted images that fool a discriminator trained to distinguish real from fake inpainted images.

For the Foreground image:

Reconstruction loss: This is the error between the foreground pixels in the input ROI and pixels of the predicted foreground image. The foreground pixels are selected using the predicted binary mask. Reconstruction loss in a foreground image may include, for example, L1, L2 and/or perceptual losses.

Energy loss: This loss minimizes the total energy of the predicted foreground signal to encourage smoothly varying color. Energy loss in a foreground image may consider energy and/or smoothness.

For the predicted Binary Mask:

Reconstruction loss: This loss minimizes the error between the predicted binary mask and the ground truth binary mask. Reconstruction loss in a mask may include, for example, L1, L2, and/or perceptual losses.

For the whole image (in which the predicted foreground, background and binary mask are used to reconstruct the image):

Reconstruction loss: This loss minimizes the error between the input ROI and the reconstructed output ROI. During training, the target mask 113 contains the same text string as the input ROI. End-to-end reconstruction loss in a mask may include, for example, L1, L2, and/or perceptual losses.

Adversarial loss: The reconstructed image should be realistic enough to fool a discriminator trained to distinguish real images from altered (i.e., inpainted) images.

Other losses, such as the difference between foreground and background pixel statistics (such as mean or variance), or the difference in background regions between predicted output and input. Each of these losses, when available, will be input into the model with the training images during the training process.

Ground truth for inpainted regions may be determined in any number of ways, such as using a graphics rendering program to create a dataset of image pairs, in which each pair has the same scene but only one pair has text.

The data set may be manually selected or synthetically generated, with varied colors for foreground or background images. The process illustrated in FIGS. 1 and 2 provide a multi-tasking process in which the network is tasked to jointly produce naturalistic inpainted background regions that preserve texture and other characteristics, a foreground image that preserves the text color, and a binary mask that distinguishes foreground regions from background regions. This disentangling enables the system to define loss functions for each region separately.

Figure 4:
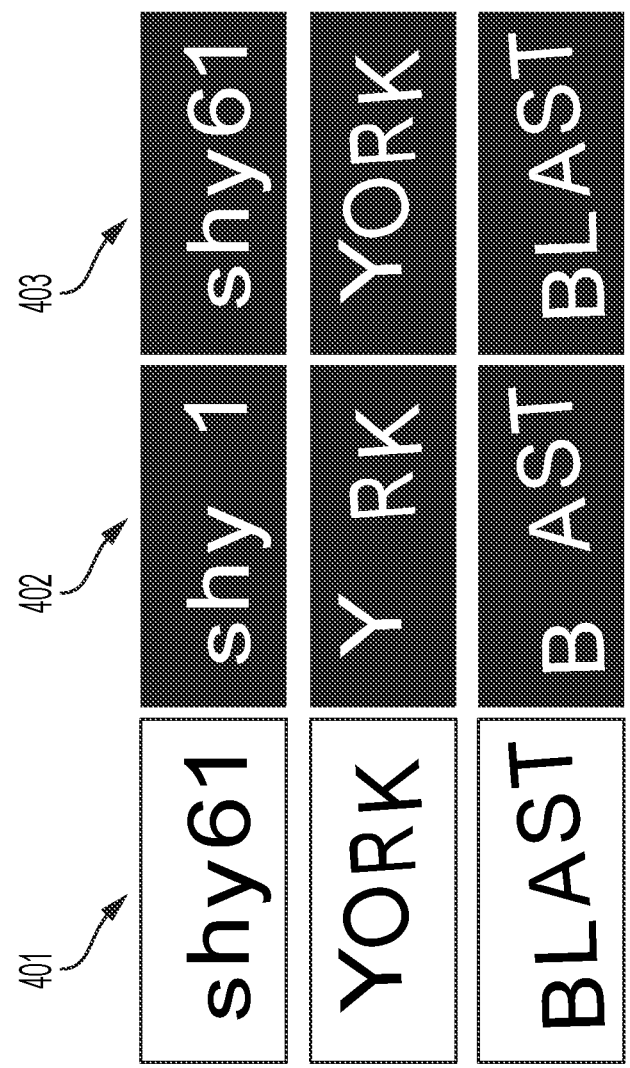
FIG. 4 compares example images, before and after processing, using a prior art method and methods described in this document.

FIG. 4 illustrates an example comparison of masks generated by prior art systems as compared to those of the processes described in this document. In FIG. 4, column 401 shows cropped ROIs from original image frame. Column 402 shows binary masks generated using mask RCNN as known in the prior art. Column 403 shows binary masks generated by an example of the present invention. As can be seen by comparing columns 402 and 403, the prior art missed some of the characters of the original image when predicting its mask, while the present invention accurately captured all of the characters from the original image.

Figure 5:
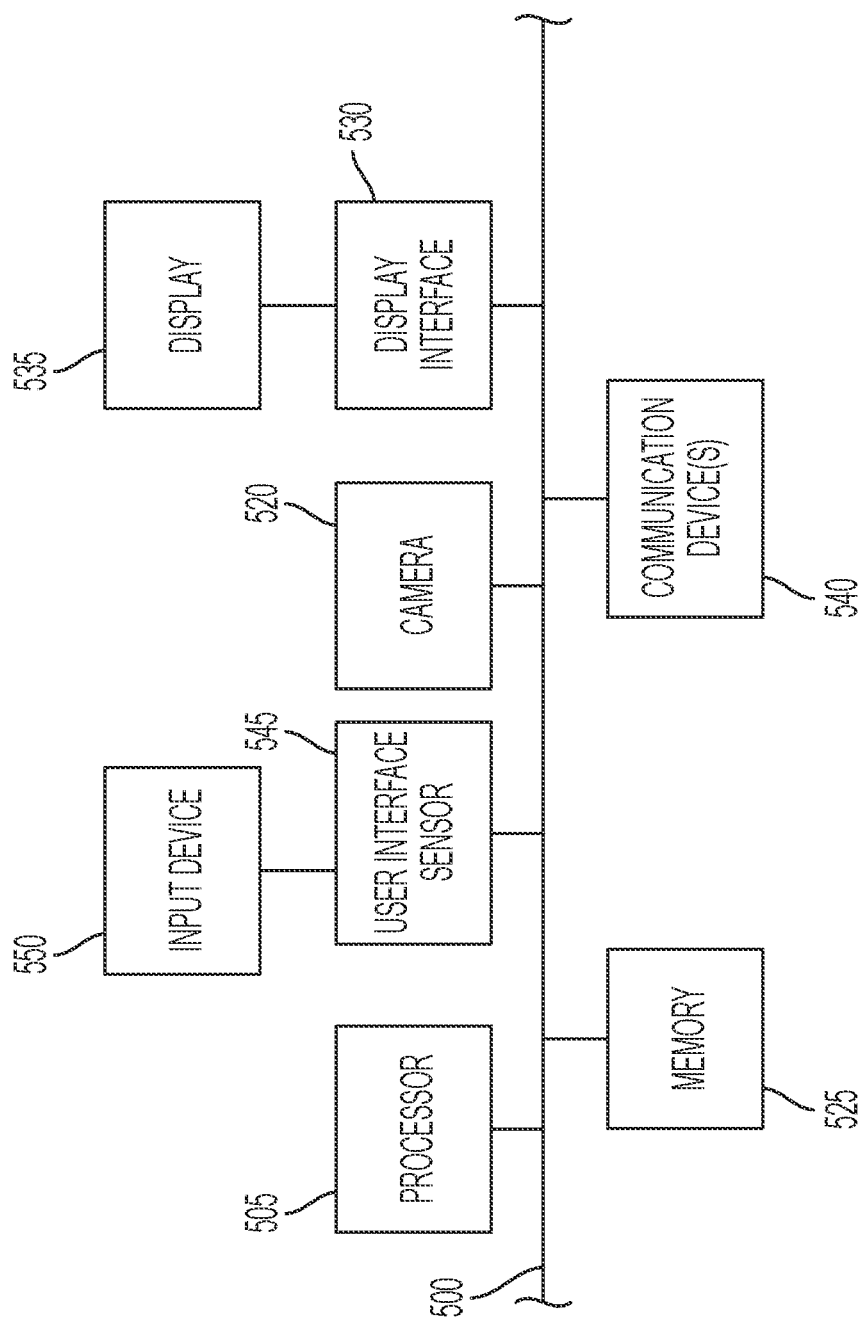
FIG. 5 illustrates example hardware elements of a video processing system.

FIG. 5 depicts an example of internal hardware that may be included in an image processing system, such as a local or remote computing device that processes image frames as described above. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. The programming instructions may be configured to cause the processor to perform any or all of the methods described above. Read only memory (ROM), random access memory (RAM), flash memory, hard drives and other devices capable of storing electronic data constitute examples of memory devices 525. A memory device may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, an RFID tag and/or short-range or near-field communication transceiver, each of which may optionally communicatively connect with other components of the device via one or more communication system. The communication device 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Such devices may be used to help label images in training the model. Digital image frames also may be received from a camera 520 that can capture video and/or still images.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, personal digital assistants, cameras, tablet computers, laptop computers, media players and the like. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility," "computer-readable medium" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A "computer program product" is a computer-readable medium with programming instructions stored on it.

A "machine learning model" or a "model" refers to a set of algorithmic routines and parameters that can predict an output(s) of a real-world process (e.g., replacement of scene text) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology. Example machine learning models include neural networks such as convolutional neural networks (CNNs), generative adversarial networks (GANs), and other trained networks that exhibit artificial intelligence.

The term "bounding box" refers to a rectangular box that represents the location of an object. A bounding box may be represented in data by x- and y-axis coordinates [$x_{max}$, $y_{max}$] that correspond to a first corner of the box (such as the upper right corner), along with x- and y-axis coordinates [$x_{min}$, $y_{min}$] that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A digital image frame editing method comprising, by a processor:
receiving a digital image frame;
processing the digital image frame to define a region of interest (ROI) that contains original text;
processing the ROI through a multi-task machine learning model to predict, in parallel processes:
a foreground image of the ROI, wherein the foreground image comprises the original text,
a background image of the ROI, wherein the background image omits the original text, and
a binary mask that distinguishes foreground image pixels from background image pixels in the ROI;
receiving a target mask that contains replacement text; and
applying the target mask to blend the background image with the foreground image and yield a modified digital image that includes the replacement text and omits the original text,
wherein the multi-task machine learning model comprises:
a single deep neural encoder that receives the ROI, and
separate deep neural decoders for predicting each of the foreground image, the background image and the binary mask; and
wherein the method further comprises, before applying the target mask:
using the binary mask to extract an average background signal of the ROI, and
using the average background signal to modify the background image produced by the decoder that predicted the background image, wherein using the average background signal to modify the background image comprises:
generating a residual signal as a difference between the average background signal extracted by the binary mask and the average background signal of the predicted background image, and
modifying the predicted background image by adding the residual signal to substantially every pixel in the predicted background image.

2. The method of claim 1 further comprising, before receiving the digital image frame, training the multi-task machine learning model on a dataset comprising ground truth foreground images, ground truth background images and ground truth mask images with one or more of the following losses
background reconstruction loss;
background adversarial loss;
foreground reconstruction loss;
mask reconstruction loss;
end to end reconstruction loss; or
end to end adversarial loss.

3. The method of claim 1 further comprising, before applying the target mask:
using the binary mask to extract an average foreground signal from the foreground image; and
using the average foreground signal to modify the foreground image produced by the decoder that predicted the foreground image.

4. The method of claim 3, wherein using the average foreground signal to modify the foreground image comprises modifying the foreground image by adding the extracted average foreground signal to the foreground image.

5. The method of claim 1, wherein applying the target mask to blend the background image with the foreground image and yield the modified digital image further comprises:
generating a modified ROI by applying the target mask to blend the background image with the foreground image; and
replacing the ROI of the received digital image frame with the modified ROI.

6. The method of claim 1, wherein the blending comprises:
assigning a color value of the foreground image to foreground pixels of the target mask; and
assigning a color value of the background image to background pixels of the target mask.

7. The method of claim 1, wherein the blending comprises using a generative neural network to blend the foreground image with the background image through the target mask.

8. The method of claim 1, wherein the machine learning model comprises a deep neural network.

9. The method of claim 1, wherein processing the digital image frame to define the ROI comprises:
applying a text detector to the digital image frame to return bounding box coordinates; and
defining the ROI according to the bounding box coordinates.

10. A digital image frame editing system comprising:
a processor; and
a memory device containing programming instructions that are configured to cause the processor to:
receive a digital image frame,
process the digital image frame to define a region of interest (ROI) that contains original text,
process the ROI through a multi-task machine learning model to determine, in parallel processes:
a foreground image of the ROI, wherein the foreground image comprises the original text;
a background image of the ROI, wherein the background image omits the original text; and
a binary mask that distinguishes foreground image pixels from background image pixels in the ROI,
use the binary mask to extract an average foreground signal from the foreground image,
modify the foreground image by adding the extracted average foreground signal to the foreground image,
receive a target mask that contains replacement text, and
apply the target mask to blend the background image with the foreground image and yield a modified digital image that includes the replacement text and omits the original text.

11. The system of claim 10 wherein the multi-task machine learning model comprises:
a single deep neural encoder for receiving the ROI; and
separate deep neural decoders for predicting each of the foreground image, the background image and the binary mask.

12. The system of claim 10 further comprising:
a dataset comprising ground truth foreground images, ground truth background images and ground truth mask images; and
additional programming instructions that are configured to cause the processor to, before receiving the digital image frame, train the multi-task machine learning model on the dataset with one or more of the following losses
background reconstruction loss,
background adversarial loss,
foreground reconstruction loss,
mask reconstruction loss,
end to end reconstruction loss, or
end to end adversarial loss.

13. The system of claim 10, further comprising additional instructions configured to cause the processor to, before applying the target mask:
generate a residual correction signal; and
apply the residual correction signal to the background image.

14. The system of claim 10, further comprising additional instructions configured to cause the processor to:
use the binary mask to extract an average background signal from the ROI of the digital image frame;
identify an average background signal of the background image;
generate a residual signal as a difference between the average background signal extracted by the binary mask for the ROI of the digital image frame and the average background signal of the background image; and
modify the background image by adding the residual signal to substantially every pixel in the background image.

15. The system of claim 10, wherein the instructions to apply the target mask to blend the background image with the foreground image and yield the modified digital image further comprise instructions to:
generate a modified ROI by applying the target mask to blend the background image with the foreground image; and
replace the ROI of the received digital image frame with the modified ROI.

16. The system of claim 10, wherein the instructions to blend comprise instructions to:
assign a color value of the foreground image to foreground pixels of the target mask; and
assign a color value of the background image to background pixels of the target mask.

17. The system of claim 10, wherein the instructions to blend comprise instructions to use a generative neural network to blend the foreground image with the background image through the target mask.

18. The system of claim 10, wherein the machine learning model comprises a deep neural network.

19. The system of claim 10, wherein the instructions to process the digital image frame to define the ROI comprise instructions to:
apply a text detector to the digital image frame to return bounding box coordinates; and
define the ROI according to the bounding box coordinates.

20. A digital image frame editing method comprising, by a processor:
receiving a digital image frame;
processing the digital image frame to define a region of interest (ROI) that contains original text;
processing the ROI through a multi-task machine learning model to predict, in parallel processes:
a foreground image of the ROI, wherein the foreground image comprises the original text,
a background image of the ROI, wherein the background image omits the original text, and
a binary mask that distinguishes foreground image pixels from background image pixels in the ROI;
receiving a target mask that contains replacement text; and
applying the target mask to blend the background image with the foreground image and yield a modified digital image that includes the replacement text and omits the original text,
wherein the multi-task machine learning model comprises:
a single deep neural encoder that receives the ROI, and
separate deep neural decoders for predicting each of the foreground image, the background image and the binary mask, and
wherein the method further comprises, before applying the target mask:
using the binary mask to extract an average foreground signal from the foreground image, and using the average foreground signal to modify the foreground image produced by the decoder that predicted the foreground image, wherein using the average foreground signal to modify the foreground image comprises modifying the foreground image by adding the extracted average foreground signal to the foreground image.

21. The method of claim 20 further comprising, before receiving the digital image frame, training the multi-task machine learning model on a dataset comprising ground truth foreground images, ground truth background images and ground truth mask images with one or more of the following losses
  background reconstruction loss;
  background adversarial loss;
  foreground reconstruction loss;
  mask reconstruction loss;
  end to end reconstruction loss; or
  end to end adversarial loss.

22. The method of claim 20 further comprising, before applying the target mask:
  using the binary mask to extract an average background signal of the ROI; and
  using the average background signal to modify the background image produced by the decoder that predicted the background image.

23. The method of claim 20, wherein applying the target mask to blend the background image with the foreground image and yield the modified digital image further comprises:
  generating a modified ROI by applying the target mask to blend the background image with the foreground image; and
  replacing the ROI of the received digital image frame with the modified ROI.

24. The method of claim 20, wherein the blending comprises:
  assigning a color value of the foreground image to foreground pixels of the target mask; and
  assigning a color value of the background image to background pixels of the target mask.

25. The method of claim 20, wherein the blending comprises using a generative neural network to blend the foreground image with the background image through the target mask.

26. The method of claim 20, wherein the machine learning model comprises a deep neural network.

27. The method of claim 20, wherein processing the digital image frame to define the ROI comprises:
  applying a text detector to the digital image frame to return bounding box coordinates; and
  defining the ROI according to the bounding box coordinates.

28. A digital image frame editing system comprising:
  a processor; and
  a memory device containing programming instructions that are configured to cause the processor to:
  receive a digital image frame,
  process the digital image frame to define a region of interest (ROI) that contains original text,
  process the ROI through a multi-task machine learning model to determine, in parallel processes:
    a foreground image of the ROI, wherein the foreground image comprises the original text;
    a background image of the ROI, wherein the background image omits the original text; and
    a binary mask that distinguishes foreground image pixels from background image pixels in the ROI,
  use the binary mask to extract an average background signal from the ROI of the digital image frame,
  identify an average background signal of the background image,
  generate a residual signal as a difference between the average background signal extracted by the binary mask for the ROI of the digital image frame and the average background signal of the background image,
  modify the background image by adding the residual signal to substantially every pixel in the background image,
  receive a target mask that contains replacement text, and
  apply the target mask to blend the background image with the foreground image and yield a modified digital image that includes the replacement text and omits the original text.

29. The system of claim 28, wherein the multi-task machine learning model comprises:
  a single deep neural encoder for receiving the ROI; and
  separate deep neural decoders for predicting each of the foreground image, the background image and the binary mask.

30. The system of claim 28, further comprising:
  a dataset comprising ground truth foreground images, ground truth background images and ground truth mask images; and
  additional programming instructions that are configured to cause the processor to, before receiving the digital image frame, train the multi-task machine learning model on the dataset with one or more of the following losses
  background reconstruction loss,
  background adversarial loss,
  foreground reconstruction loss,
  mask reconstruction loss,
  end to end reconstruction loss, or
  end to end adversarial loss.

31. The system of claim 28, further comprising additional instructions configured to cause the processor to, before applying the target mask:
  generate a residual correction signal; and
  apply the residual correction signal to the background image.

32. The system of claim 28, wherein the instructions to apply the target mask to blend the background image with the foreground image and yield the modified digital image further comprise instructions to:
  generate a modified ROI by applying the target mask to blend the background image with the foreground image; and
  replace the ROI of the received digital image frame with the modified ROI.

33. The system of claim 28, wherein the instructions to blend comprise instructions to:
  assign a color value of the foreground image to foreground pixels of the target mask; and
  assign a color value of the background image to background pixels of the target mask.

34. The system of claim 28, wherein the instructions to blend comprise instructions to use a generative neural network to blend the foreground image with the background image through the target mask.

35. The system of claim 28, wherein the machine learning model comprises a deep neural network.

36. The system of claim 28, wherein the instructions to process the digital image frame to define the ROI comprise instructions to:
   apply a text detector to the digital image frame to return bounding box coordinates; and
   define the ROI according to the bounding box coordinates.

* * * * *